United States Patent [19]
Gordini

[11] Patent Number: 4,748,219
[45] Date of Patent: May 31, 1988

[54] REACTOR FOR POLYMERIZATION IN CONCENTRATED SYSTEMS

[75] Inventor: Silvano Gordini, San Donato Milanese, Italy

[73] Assignee: Enichem Elastomeri S.p.A., Palermo, Italy

[21] Appl. No.: 870,162

[22] Filed: Jun. 3, 1986

[30] Foreign Application Priority Data

Jun. 5, 1985 [IT] Italy .............................. 21040 A/85

[51] Int. Cl.$^4$ ........................ C08F 2/02; C08F 136/06; B01F 7/16; B01J 14/00
[52] U.S. Cl. .................................... 526/88; 366/303; 366/304; 422/135; 422/225; 526/340.4
[58] Field of Search ............... 422/131, 135, 224, 225, 422/137, 229; 366/303, 304, 158, 186, 289; 526/335, 340.4, 88

[56] References Cited

U.S. PATENT DOCUMENTS

| | | | |
|---|---|---|---|
| 1,854,732 | 4/1932 | Beran | 366/304 |
| 3,459,620 | 8/1969 | McCleary et al. | 366/303 |
| 3,840,509 | 10/1974 | Kajimoto et al. | 422/137 |
| 4,091,457 | 5/1978 | Slywka | 366/304 |
| 4,361,414 | 11/1982 | Nemes et al. | 366/304 |

*Primary Examiner*—Michael S. Marcus
*Attorney, Agent, or Firm*—Hedman, Gibson, Costigan & Hoare

[57] ABSTRACT

A reactor for carrying out polymerizations in systems with high concentration of polymer is constituted by a cylindrical body having vertical axis with upper and lower heads; in correspondence of a generatrix of the cylinder an opening with vertical-axis is provided, which puts the interior of the cylinder in communication with the body of an extruder, it too with vertical axis, and solid with the reactor.

2 Claims, 1 Drawing Sheet

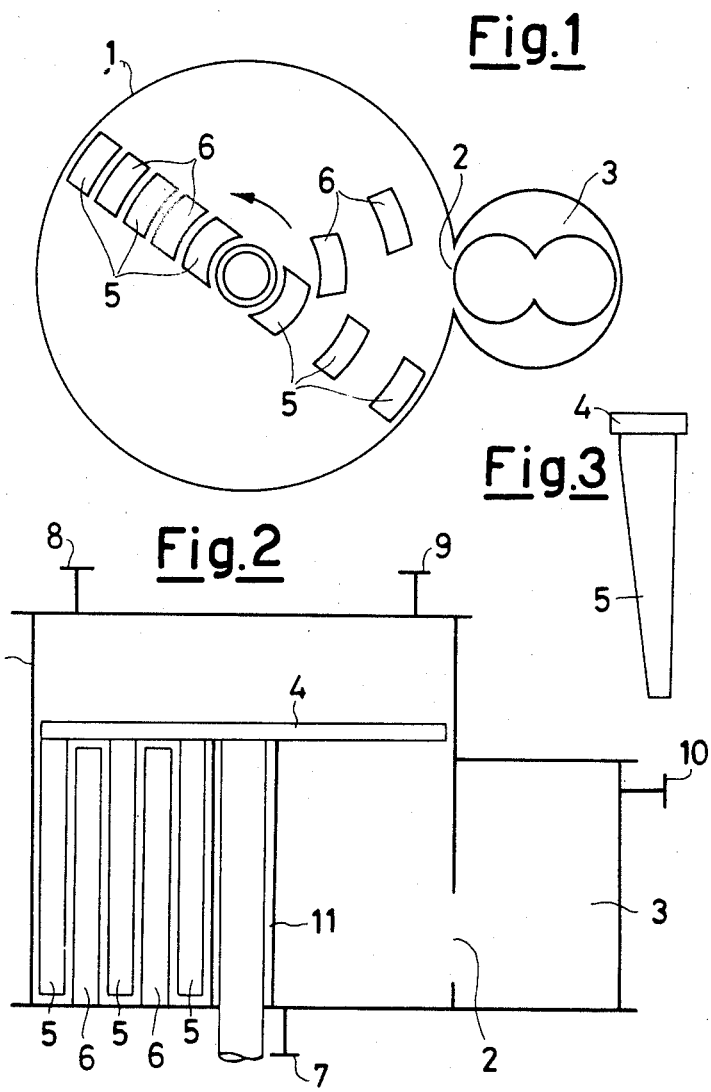

REACTOR FOR POLYMERIZATION IN CONCENTRATED SYSTEMS

The present invention relates to a reactor of new conception, suitable to carry out polymerizations in systems with high concentration of polymer.

More particularly, the present reaction relates to a reactor essentially constituted by a cylindrical body having vertical axis, with upper and lower heads; in correspondence of a generatrix of the cylinder there is provided a vertical-axis opening, which puts the interior of the cylinder in communication with the body of an extruder, it too with vertical axis, and solid with the reactor.

It is known how much it is convenient to operate the polymerization reactors, in the case of polymerization processes during which the polymer is formed in solution or in suspension in organic media, at a polymer concentration as high as possible. Such a way of proceeding, particularly when the concentration of polymer at reactor outlet is increased, allows considerable savings in energetic consumptions to be achieved.

However, all the methods followed so far in order to increase the polymer concentration to values as high as possible, to the purpose of achieving the highest saving, have not led to meaningful commercial results, so the processes of the prior art in which the polymer is formed either in suspension or in solution is organic media are still now being operated within concentration ranges which do not exceed 30% by weight, whilst the theory teaches that the satisfactory condition to the purpose of achieving an optimum energetic saving, is bound to a polymer concentration of the order of 60–70% by weight.

Thus, due to the fact that operating in systems at high concentration of polymer becomes economically unadvisable, resorting to processes of polymerization on fluid bed, or to processes in emulsion or suspension in aqueous media is preferred.

However, many cases occur in which operating either in aqueous media, for instance because of the type of catalysis used (Ziegler-Natta, anionic, cationic catalysis), or on fluid bed, for instance due to the characteristics of produced polymer, as it occurs for the common elastomers, due to their too high tackiness, is not possible. In these cases, the industrial full-scale productions are still presently accomplished by operating the polymerization in organic media, wherein the polymer remains dissolved or suspended while it is being formed, at the above seen low concentrations, with all the drawbacks which too have been briefly mentioned.

In the specific case of the conjugated diolefins, the polymerization is mostly carried out in hydrocarbon solution to the purpose of controlling the polymerization temperature and hence obtaining soluble linear polymers, gel-free or essentially gel-free and having controlled molecular weight.

The bulk polymerization of conjugated diolefins on the contrary has not found a meaningful development in the industrial practice, notwithstanding the undoubted advantages which a process carried out in the absence, or in the substantial absence of solvents or diluents would show as compared to a traditional process in solution.

The reasons for that can be found in the uncertain or missed identification of suitable catalytic systems and/or in the difficulties posed by the engineering, reological and heat exchange problems involved by the handling or high-viscosity polymeric masses. So, the reaction heat must be withdrawn as evaporation latent heat of the reaction medium, and the vapours evolving from the reacting system must leave it at moderate rates in order not to drag with them polymeric masses to such an extent as to obstruct the outlet nozzle of the reactor. Furthermore, an accurate control of the reaction conditions must be possible, in such a way as not to have anomalies in the polymer formation history.

The Applicant has found that obtaining the foregoing is possible by carrying out the bulk polymerization of the conjugated diolefins in a reactor which furthermore shows other considerable advantages, such as the self-cleaning and the steadfastness in the distribution of permanence times.

In fact, the object of the present invention is a reactor which allows polymerization reactions to be carried out in systems with high concentration of polymer, in particular bulk polymerizations and copolymerizations of conjugated diolefins.

The reactor is diagrammatically shown in the accompanying drawing wherein:
FIG. 1 is a generic cross-sectional view;
FIG. 2 is a generic lengthwise sectional view, and
FIG. 3 shows a detail view of a stirrer blade.

Said reactor being essentially constituted by a vertical-axis cylindrical body 1 with upper and lower heads and in which, in correspondence of a generatrix of the cylinder, an opening 2 with vertical axis is provided, which puts the interior of the cylinder in communication with the body 3 of an extruder, which too has vertical axis and is solid with the reactor.

Going ahead with our reference to the figures, the reactor is provided with a vertical - axis stirrer, the shaft of which enters from the bottom or from the top of the reactor. To the shaft one or more arms 4 perpendicular to it are affixed, each of which supports a certain number of vertical blades 5.

Such blades are tapered from up downwards, so as to exert a thrust directed towards the reactor bottom, depending on the stirrer revolution direction.

The reactor is furthermore provided with one or more set(s) of stationary blades 6, in correspondence of the free spaces between the stirrer blades 5. In correspondence of the opening 2, the relative position of the revolving blades 5 and of the stationary blades 6 is such that the revolving blades positioned near the reactor centre may reach the corresponding stationary blades before the peripheral blades. The result of such a positioning is that whenever the revolving blades reach, during their revolution, the stationary blades positioned in correspondence of the opening 2, to the contents of the reactor a thrust directed towards the periphery, and hence towards the opening 2 is applied.

In correspondence of the other zones of the reactor, the stationary blades can be reached by the revolving blades either simultaneously, or according the above modalities, on the basis of the overall conveyance rate towards the periphery.

The stirrer shaft is provided with an outer jacket 11 constituted by a pipe solid with the bottom head of the reactor, to the purpose of avoiding the Weissenberg's effect, which would occur, should the shaft rotate under contact with the reaction medium.

The reactor is provided with a nozzle 7 for feeding the catalyst to be used in the polymerization reaction, positioned in the nearby of the shaft jacket, and with a nozzle 8 for feeding the monomer (or the monomer and the possible solvent).

An outlet nozzle 9 for the vapourized reaction medium for withdrawing the reaction heat (or for the vapours of the same monomer, in case of bulk polymerization, always to the purpose of controlling the temperature) and an outlet nozzle 10 for the polymer in the form of a concentrated solution in the monomer(s), or in the possible mixture thereof with a solvent are furthermore provided.

The extruder can be a single-screw or a twin-screw extruder; the characteristics of such screws are such as to provide a conveyance zone in correspondence of the polymer inlet from the reactor, such a zone being hence at least equal in length to the opening 2, and a compression zone.

Of course, the usual measuring instruments, such as, e.g., the equipment for the measurement of the temperature, for the measurement of the maximum level of reacting system, etc., are present.

The above described reactor can be used to carry out any polymerizations in systems at high polymer concentration, up to 60% by weight, and higher.

A particular case of use is that relating to the bulk polymerization of conjugated diolefins, according to which the catalyst is added to a simple homogeneous system containing one or more monomer(s).

Such a polymerization is the object of the following operative Example, from which further details shall appear as regards the reactor; the purpose of this Example is to evidence the situation occurring inside the reactor during the operation, thus peculiarly illustrating the invention, the scopes of which however must not absolutely be considered as limited to it or by it.

EXAMPLE

A test has been carried out according to a continuous procedure by using a reactor having an inner diameter of 250 mm, and blades of 300 mm in height, equipped with two sets of three revolving blades and with three sets of two stationary blades: during this test butadiene has been polymerized in the absence of solvent, by using a catalyst on neodymium basis complying with the following definition:

(a) At least one neodymium compound selected among oxide, alcoholates, phenates and carboxylates of neodymium or mixtures of this with other components of rare earths;

(b) at least one organic compound containing (alcoholic or phenolic) hydroxy groups or carboxy groups, selected among alcohols, phenols and carboxy acids, with the possible addition of water;

(c) at least one metallorganic compound of aluminium or of its corresponding hydride derivatives.

(d) At least one halogenated compound, selected among secondary or tertiary alkyl halides, aryl or alkylaryl halides, halides of organic acids, metal or organometallic halides, hydrogen halides and halogens In particular, it has been used the composition prepared as follows:

Into a vessel of 5 liters of capacity, equipped with stirrer and heat exchange system, under nitrogen atmosphere there are charged:

220 g (0.62 mol) of neodymium oxide ($Nd_2O_3$) at 95%;

945 g (3.9 mol) of naphthenic acid, with acidity number of 230;

180 g (1.9 mol) of tert.butyl chloride at 98%;

2.8 kg of vaseline oil;

10 ml of aqueous solution of HCl at 37% by weight.

The mixture is kept stirred inside the vessel under nitrogen atmosphere, at the temperature of 60° C., for 3 hours. At the end of this time period, a mixture having an oily appearance is obtained.

The mixture so obtained is charged into a vessel of 120 liters of capacity, equipped with stirrer. Into the same vessel also 50 l is charged of a solution containing 0.8 mol/l of aluminium diisobutylmonohydride in vaseline oil.

The reaction mass is kept stirred under nitrogen at room temperature (about 20° C.), for 2 hours.

At the end of this time period, a catalytic solution is obtained, which contains the following concentrations, referred to neodymium, aluminium and chlorine:

neodymium: 0.023 gram-atoms/l
aluminium: 0.74 gram-atoms/l
chlorine: 0.034 gram-atoms/l, which is used in polymerization.

Different productive capacities have been tested within the range of from 4 kg/h to 20 kg/h of polymer, by varying the stirrer rate from 20 to 80 revolutions per minute, while the temperature (60° C.) and the speed of the discharging extruder (80 g/min) having been kept constant.

A typical run corresponds to the following conditions:

fed butadiene: 55 kg/h
butadiene vapourized and recycled after condensation: 35 kg/h
catalyst feed: corresponding to 8 mM/h of Nd
production obtained: 11 kg/h of polymer
Mooney viscosity of the polymer: 41±2
polymer concentration at the extruder outlet: about 62%

Polybutadiene is insoluble in the monomer. Under steady state conditions, inside the reactor the following situation is established, starting from the bottom:

a layer of monomer-swollen polymer under equilibrium conditions (solid phase), maintained in the lowest portion of the reactor because the stirrer blades have, as it has been seen hereinabove, a thrust effect directed downwards;

a layer of monomer wherein a negligible amount of polymer is dissolved;

a gas top layer.

The catalyst, fed in the nearby of the shaft jacket, results uniformly distributed inside the solid phase surrounding the same jacket, due to the action carried out by the revolving blade.

I claim:

1. A process for bulk-polymerization of butadiene to polybutadiene in the presence of a polymerization catalyst, comprising:

feeding monomeric butadiene into the top of a cylindrical-bodied and vertical axis reactor having a bottom, fixed vertical veins extending from said bottom toward said top, and a vertical-axis stirrer including a rotable shaft and downwardly extending tapered veins rotated by said shaft and insertable between said fixed veins;

feeding the polymeric catalyst into the bottom of said reactor in the vicinity of the stirrer shaft;

polymerizing monomeric butadiene within the reactor body;

discharging vaporized butadiene monomer through the top of said reactor; and discharging polybutadiene into the extruding chamber of a vertical-axis extruder integral, and communicating with, the bottom section of the reactor body, the discharge taking place through the combined actions of the fixed veins and the moveable veins within the reactor body.

2. An apparatus for the bulk-polymerization of butadiene to polybutadiene in the presence of a polymerization catalyst, comprising:

a cylindrical-bodied and vertical axis reactor having a top and a bottom, fixed vertical vanes within said reactor extending from said bottom toward said top, and a vertical-axis stirrer within said reactor including a rotatable shaft and downwardly extending tapered vanes rotated by said shaft and insertable between said fixed vanes;

a vertical-axis extruder integral with said reactor and having an extruding chamber communicating with the bottom of said reactor;

means for feeding butadiene monomer into the top of said reactor at a point spaced from said extruder;

means for feeding the polymeric catalyst into the bottom of said reactor in the vicinity of the stirrer shaft;

means for discharging vaporized butadiene monomer through the top of said reactor; and means for discharging polybutadiene polymerized within said reactor into said extruding chamber of said vertical-axis extruder through the combined actions of said fixed vanes and said moveable vanes within the reactor.

* * * * *